(12) United States Patent
Kaizu et al.

(10) Patent No.: US 7,850,815 B2
(45) Date of Patent: Dec. 14, 2010

(54) SUBSTRATE ASSEMBLING APPARATUS AND SUBSTRATE ASSEMBLING METHOD USING THE SAME

(75) Inventors: Takuya Kaizu, Ryugasaki (JP); Hiroaki Imai, Ryugasaki (JP); Masayuki Saito, Tsukubamirai (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 271 days.

(21) Appl. No.: 11/748,525

(22) Filed: May 15, 2007

(65) Prior Publication Data

US 2007/0289711 A1 Dec. 20, 2007

(30) Foreign Application Priority Data

May 17, 2006 (JP) ............................. 2006-137211

(51) Int. Cl.
*B29C 65/00* (2006.01)
*B31B 1/60* (2006.01)
*B32B 37/00* (2006.01)
*B32B 17/00* (2006.01)
*C03C 27/00* (2006.01)

(52) U.S. Cl. ..................... 156/285; 156/286; 156/287; 156/60; 156/381; 156/382; 156/104

(58) Field of Classification Search ......... 156/285–287, 156/60, 381–382, 104
See application file for complete search history.

(56) References Cited

U.S. PATENT DOCUMENTS

| 3,818,823 A * | 6/1974 | Bond ........................ 100/322 |
| 4,661,141 A * | 4/1987 | Nitschke et al. ............ 65/273 |
| 2004/0047993 A1 * | 3/2004 | Kumar et al. ............... 427/294 |

FOREIGN PATENT DOCUMENTS

JP      2005-351961      12/2005

* cited by examiner

*Primary Examiner*—Khanh Nguyen
*Assistant Examiner*—Matthew Hoover
(74) *Attorney, Agent, or Firm*—Antonelli, Terry, Stout & Kraus, LLP.

(57) ABSTRACT

A technique which solves the problem of conventional laminating apparatuses that a substrate may be deformed when released by pushing lift pins against the substrate held on an adhesive member by suction. An upper table inside a chamber has, on its substrate holding face, an elastic plate provided with an elastic body, a vacuum suction means and a purge gas blow means. A plurality of adhesive pins are provided on an adhesive pin plate which can move up and down independently from the upper table. The upper table and the elastic plate have through holes through which the adhesive pins can move and the adhesive pins have adhesion means at their tips.

5 Claims, 3 Drawing Sheets

SUBSTRATE ASSEMBLING APPARATUS AND SUBSTRATE ASSEMBLING METHOD USING THE SAME

BACKGROUND OF THE INVENTION (1) Field of the Invention

The present invention relates to a substrate assembling apparatus which drops liquid crystal and stick substrates together in vacuum to produce a liquid crystal display, and a substrate assembling method using the same.

(2) Description of the Related Art

Japanese Patent Application Laid-Open No. 2005-351961 discloses a substrate laminating apparatus in which an upper table and a lower table (or either table) for holding an upper substrate and a lower substrate and sticking them together have circular adhesive members formed around round ventilation holes made in a table surface for suction and adsorption by negative pressure and areas uncovered with the adhesive members are covered by a cushioning material almost equal to the adhesive member in thickness to make the table surface flush. In this apparatus, lift pins are disposed adjacent to the adhesive members and the adhesive members are peeled by pushing the pins against a substrate. In addition, an electrostatic chuck is provided in each corner of a square table so that a substrate is held in vacuum not only by the adhesive members but also by an electrostatic adsorptive force.

This laminating apparatus has a problem that the substrate might be deformed because, by pushing the lift pins against the substrate sticking to the adhesive members, when it is released.

An object of the present invention is to provide a laminating apparatus which holds a substrate in vacuum securely and does not deform the substrate when adhesive members are peeled from the substrate surface.

SUMMARY OF THE INVENTION

In order to achieve the above object, the present invention provides a technique that holes through which adhesive pins pass are made in an upper table inside an upper chamber and magnets and screw holes for fixing a plate with an elastic body are provided to make the plate replaceable. In addition, a means for moving the adhesive pins up and down can be activated independently from a means for moving the upper table up and down, and a servo motor or stepping motor which can control the speed and positioning is used for driving so that an optimum releasing condition is attained as needed.

An adhesive sheet, which is the same as the one used in the related art except that it has vacuum suction holes, is attached to an adhesive pin tip and it is possible to replace only the tip. The sheet attached to the tip is not limited to the above-mentioned adhesive sheet; it may be another type of sheet with an adhesive force or a suction pad or the like.

The present invention permits a large substrate to be released without being deformed, contributing to production efficiency improvement in the liquid crystal display panel manufacturing process which is required to meet the growing demand for larger panels.

BRIEF DESCRIPTION OF THE DRAWINGS

The invention will be more particularly described with reference to the accompanying drawings, in which.

DETAILED DESCRIPTION OF THE PREFERRED EMBODIMENT

Next, a preferred embodiment of the present invention will be described referring to the accompanying drawings.

Figure 1:
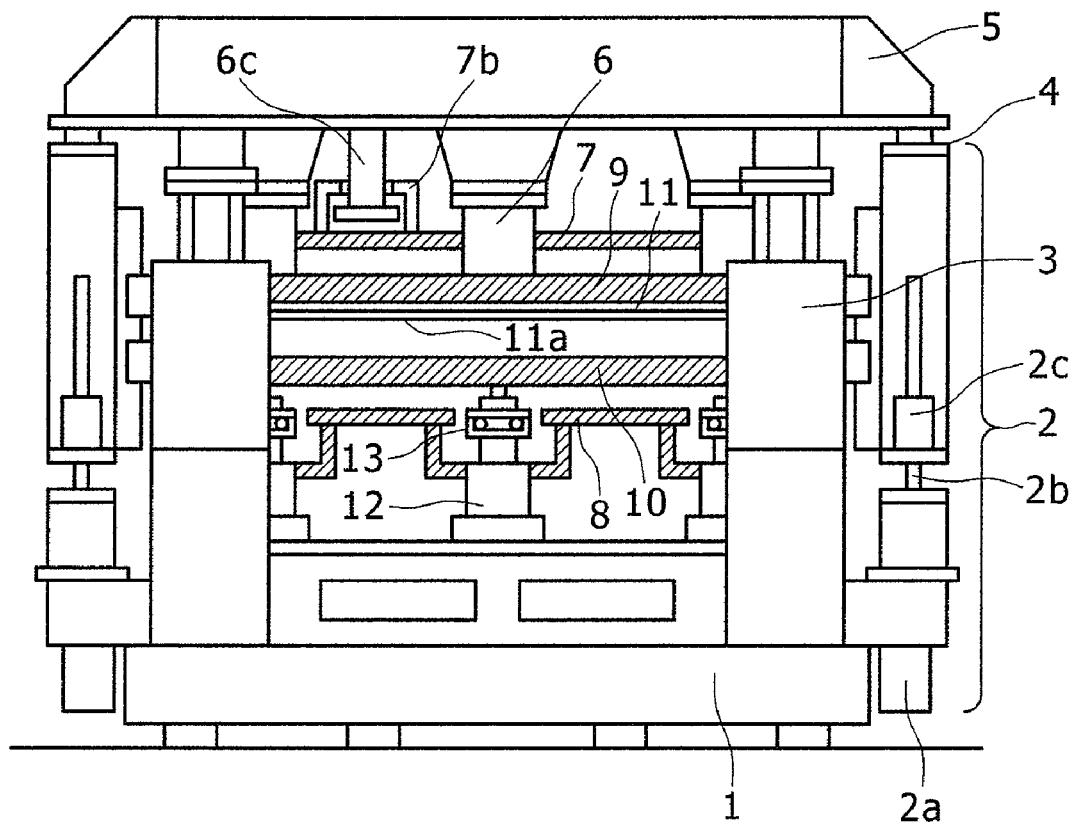
FIG. 1 schematically shows the general structure of a substrate assembling apparatus according to the present invention.
Figure 2:
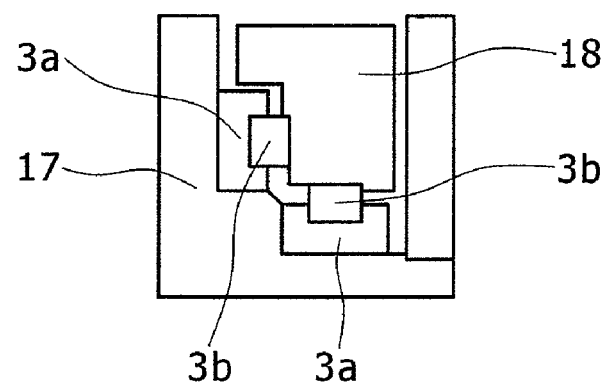
FIG. 2 illustrates a guide assembly in the apparatus.

FIG. 1 shows a substrate assembling apparatus according to an embodiment of the present invention. The substrate assembling apparatus has a base 1 and a top frame 5 as rigid supporting members, inside which an upper chamber 7 and a lower chamber 8 are located. The top frame 5 is moved up and down with respect to the base 1 by rotation of a ball screw 2b of a Z-axis drive motor 2a constituting a Z-axis drive means 2 located on the base 1, through a ball screw receiver 2c located on the top frame 5. Four sets of guide means 3 help the top frame 5 move up and down. FIG. 2 is a fragmentary sectional view of a guide means 3. As illustrated in FIG. 2, two linear guides 3a are provided on a beam 17 fixed to the base and linear movable parts 3b are provided on a beam 18 fixed to the top frame 5. As the figure shows, the guides are assembled so that one guide face is perpendicular to the other guide face.

A plurality of lower shafts 12 for supporting a lower table 10 are fitted above the base 1. Each lower shaft 12 protrudes into a lower chamber 8 through a vacuum seal for air-tightness. In addition, an X-Y-θ moving unit 13 which can move in the X, Y and θ directions independently is fitted between each lower shaft 12 and the lower table 10. Alternatively, the X-Y-θ moving unit 13 may use a ball bearing which is vertically fixed and horizontally freely movable. Plural means for moving the lower table horizontally (not shown) are located outside the lower chamber 8 in the horizontal directions (X and Y directions) of the lower table 10 so that the shafts of these means push the side faces of the lower table (along the thickness of the lower table) to determine the position of the lower table in the X, Y and θ directions.

The lower chamber 8 and upper chamber 7 can be separated and their joint has a seal ring (not shown) which prevents air leakage when the upper and lower chambers are united and evacuated.

A load cell 4 is fitted to each of the joints between the top frame 5 and the Z-axis drive means 2. The upper chamber 7 is located inside the top frame 5. The upper chamber 7 is suspended from the top frame 5 by a support shaft 6c and a bracket 7b. The upper chamber 7 can be spaced from the lower chamber 8 by moving the top frame 5 up. Also, plural upper shafts 6 are fitted to the top frame 5 as oriented toward the inside of the upper chamber 7 in order to support an upper table 9. Each upper shaft 6 and the upper chamber 7 are connected by a vacuum seal to keep the chamber airtight. Furthermore, the upper table 9 is fixed to the upper shafts 6 so that the pressure given to a substrate can be detected by the load cells 4.

The Z-axis drive means 2 moves the upper chamber 7 and the upper table 9 up and down; for this movement, the support shaft 6c for the upper chamber 7 and the support shafts (upper shafts 6) for the upper table 9 are separately provided on the top frame 5. Therefore, when the upper chamber 7 is united with the lower chamber 8, the support shaft 6c for the upper chamber 7 supports the upper chamber 7 with play so as to prevent the upper chamber 7 from giving a downward force to the lower chamber 8. Specifically, the bracket of a given height, 7b, is fitted to the top of the upper chamber 7 in a way that the flange at the tip of the support shaft 6c for the upper chamber 7 touches the inside of the bracket 7b. When the upper chamber 7 is moved up, the flange of the support shaft 6c touches the bracket 7b and the upper chamber 7 and the upper table 9 move up together. In other words, when the upper shafts 6 are moved up to move up the upper table inside the upper chamber by a given distance, the flange of the support shaft 6c touches the bracket 7b and when the shafts are moved up further, the upper table 9 and the upper chamber 7 move up together. When the upper chamber 7 moves down, it moves together with the upper table 9 until it is united with the lower chamber 8; then after the upper chamber and lower chamber are united, the upper table 9 moves toward the lower table 10 independently.

In this embodiment, since the upper table 9 and the lower table 10 are spaced from the upper chamber 7 and the lower chamber 8 as mentioned above, when they are depressurized, the chambers become deformed but the substrates can be held horizontal without this deformation being transmitted to the upper and lower tables.

The upper table 9 has an iron elastic plate 11. The elastic plate 11 has an elastic body 11a all over its surface which is supposed to touch a substrate. The elastic plate 11 is fixed by the magnetic force of plural magnets embedded in the upper table 9 and with fastening screws and thus replaceable.

Figure 3:
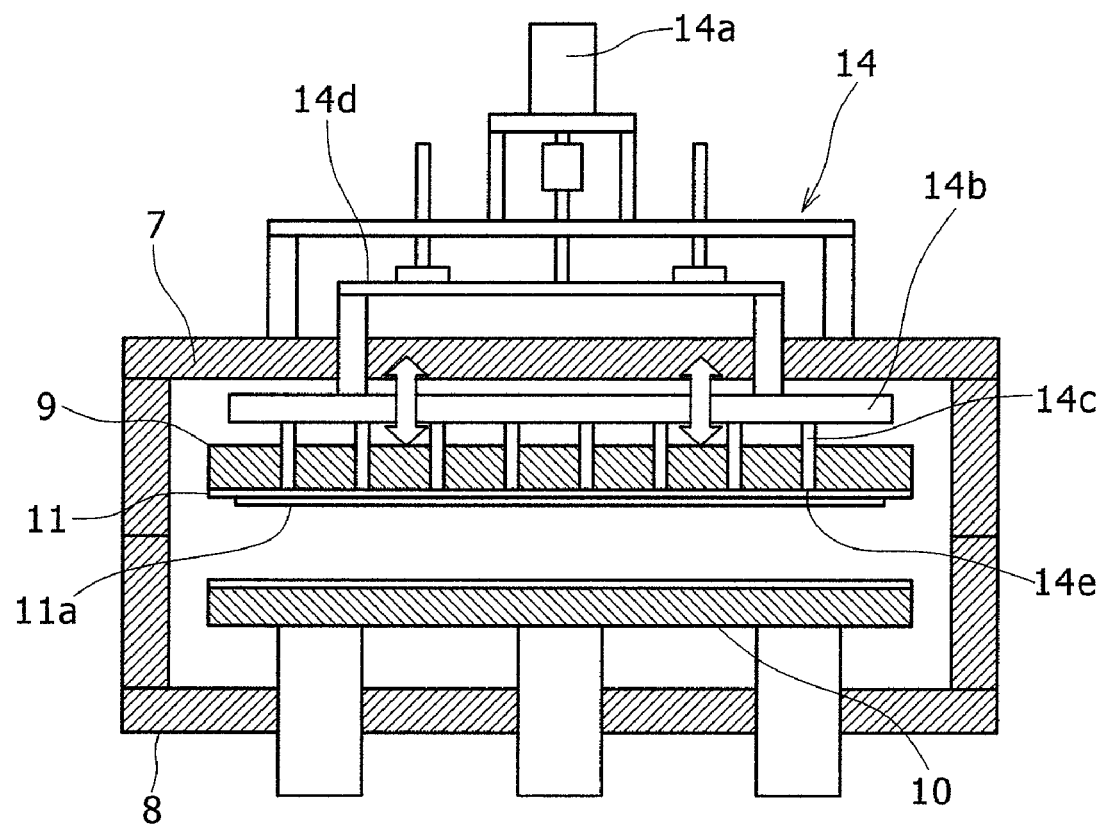
FIG. 3 schematically illustrates an adhesive pin mechanism.
Figure 4:
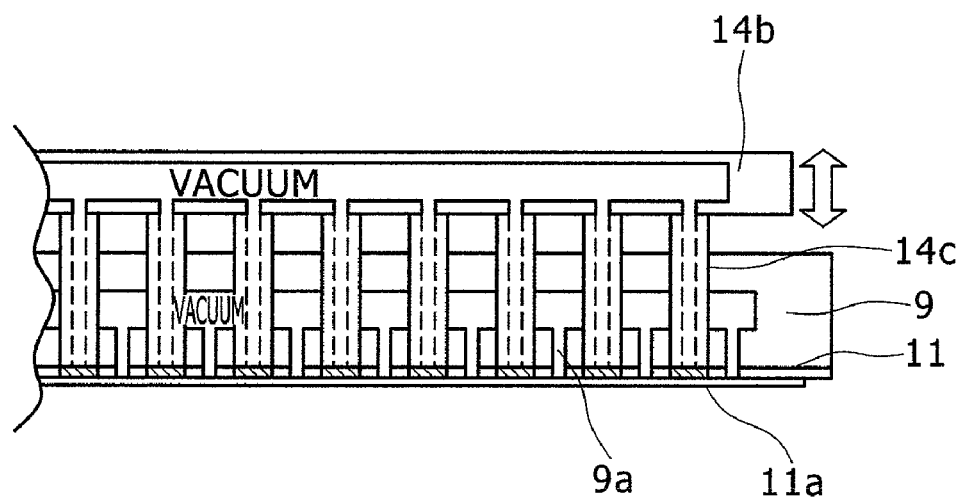
FIG. 4 schematically illustrates an upper table structure.

FIG. 3 shows the general structure of an adhesive pin mechanism. FIG. 4 is a fragmentary enlarged view of the upper table.

Figure 5:
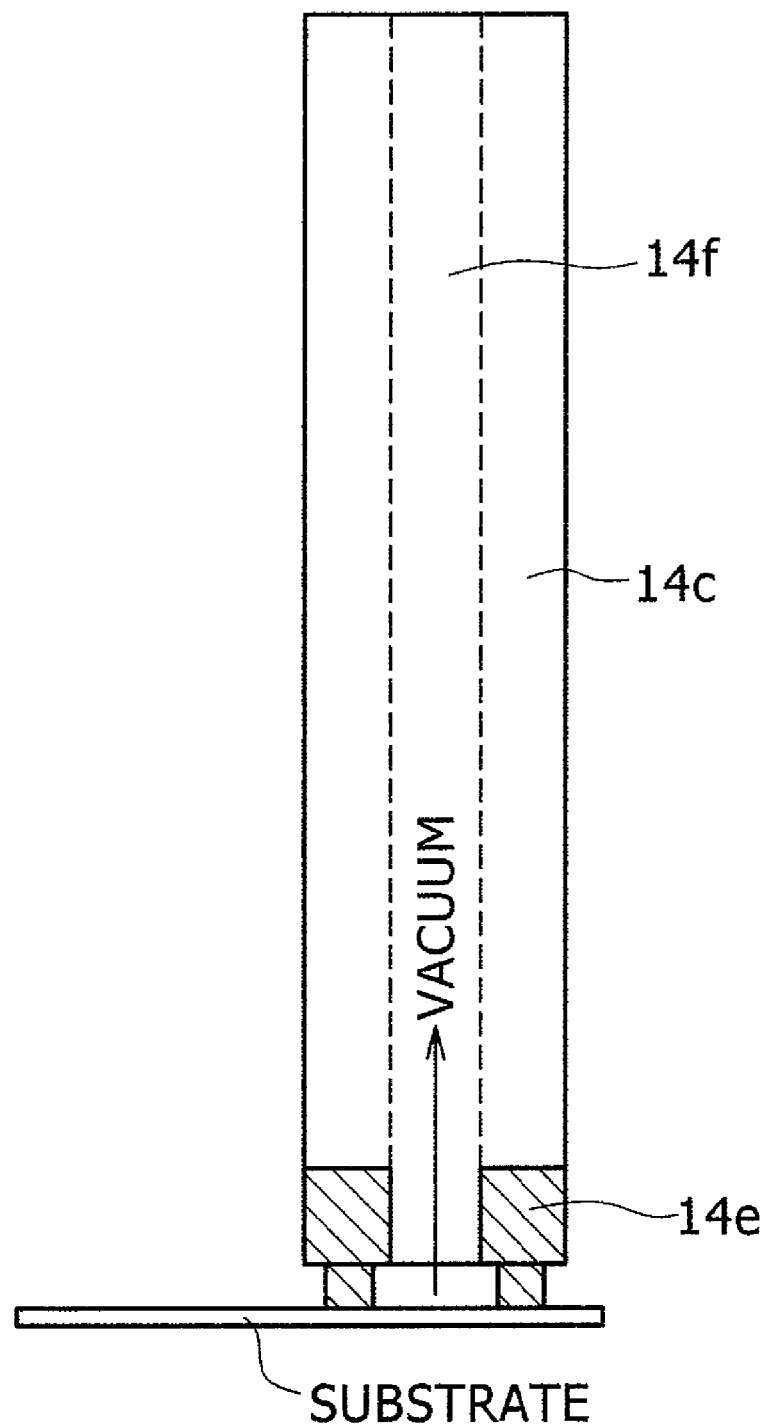
FIG. 5 illustrates an adhesive pin.

As illustrated in FIG. 3, an adhesive pin mechanism 14 which can be activated independently from the upper table 9 is fitted to the upper chamber 7 or the top frame 5. This mechanism includes: a vertical drive motor 14a; an adhesive pin plate 14b with plural adhesive pins 14c fitted thereon; and a means for moving the adhesive pins up and down, 14d, where the adhesive pin plate 14b and the adhesive pins 14c have vacuum suction means and an adhesive sheet 14e is attached to the tips of the adhesive pins 14c. The adhesive pins 14c are removable from the adhesive pin plate 14b (detachably fitted with screws), namely replaceable. Inside the adhesive pin plate 14b, there is a negative pressure chamber for supply of negative pressure which is connected with a negative pressure flow channel (adhesive pin suction/adsorption hole 14f as shown in FIG. 5) in the center of each adhesive pin 14c so that a negative pressure is supplied to an opening at the tip of the adhesive pin. The tips of the adhesive pins are covered by the adhesive sheet 14 except the openings. The adhesive pin up/down means for moving the adhesive pin plate 14b up and down and the upper chamber 7 are connected by an accordion elastic body to maintain a vacuum condition.

As illustrated in FIG. 4, the elastic plate 11 with an elastic body 11a on its surface is fitted to the substrate holding side of the upper table 9 and through holes for enabling the adhesive pins to move, the diameter of which is somewhat larger than the diameter of the adhesive pins 14c, are formed in positions corresponding to the adhesive pins through the upper table 9, elastic plate 11 and elastic body 11a. In addition, inside the upper table, there are a negative pressure chamber for supplying a negative pressure, which is separate from the adhesive pins 14c, and plural through holes which penetrate the table surface and the elastic plate 11 and elastic body 11a from the negative pressure chamber. This means that the negative pressure supplied to the negative pressure supply holes in the center of the adhesive pins and the negative pressure supplied to the negative pressure supply holes in the table surface are separately controlled. It is also possible to supply not only a negative pressure but also nitrogen gas or air through these negative pressure supply holes. Although not shown, the negative pressure supply pipes connected to the negative pressure chambers have means to switch between a negative pressure source and a purge gas (nitrogen) source or an air source. Therefore, the adhesive pins are easily removed from the substrate by supplying a positive pressure gas and the chambers are returned from a vacuum condition to an atmospheric pressure condition more quickly by supplying a purge gas.

Next, the substrate assembling sequence using the apparatus according to the present invention will be described.

First, the Z-axis drive means 2 is activated to space the upper table 9 and the lower table 10 in order to produce a space where substrates are inserted and held. The spacing here is between 100-200 mm or so. For easy maintenance or cleaning of the chamber inside, the spacing should be between 200-300 mm or so to improve workability.

Next, using a robot hand, an upper substrate with its sticking side facing the lower table 10 is carried to the lower side of the upper table 9. Plural suction support nozzles (not shown) and the adhesive pin drive mechanism 14 descend from the upper table 9 to let the upper substrate adhere to the tips of the suction support nozzles by suction. Then, the suction support nozzles ascend until their tips reach the adhesive pin plane; and a negative pressure is supplied to the adhesive pin suction/adsorption holes 14f of the adhesive pins 14c as shown in FIG. 5 to hold the substrate on the plane of the adhesive sheet 14e. Although the above-mentioned sequence uses the suction support nozzles in addition to the adhesive pin drive mechanism, instead the substrate may be held in place by suction and adsorption using only the adhesive pins 14c without suction support nozzles. The adhesive pins 14c are moved up with the substrate held on the adhesive sheet 14e at the tips of the adhesive pins 14c and the substrate is held in touch with the surface of the elastic body 11a of the elastic plate 11 fitted to the upper table 9.

Next, the procedure of making a lower substrate held on the lower table 10 will be explained. After the upper substrate is held on the upper table 9 by suction, if there is a finished substrate laminate (liquid crystal panel) on the lower table 10, the support pins (not shown) of the lower table 10 are made to protrude from the table surface to lift the finished liquid crystal panel from the lower table surface so that the robot hand can be inserted under the liquid crystal panel. Then the liquid crystal panel is taken out of the vacuum chamber by the robot hand. Then, an adhesive agent (sealant) is applied to the lower substrate surface in a circular manner and an appropriate quantity of liquid crystal is dropped on the lower substrate's area surrounded by the adhesive agent. Then the lower substrate is carried to the lower table 10 and placed on the support pins by the robot hand. Although an adhesive agent is applied to the lower substrate in the above case, it is also acceptable to apply an adhesive agent to the upper substrate or both the upper and lower substrates.

Next, the support pins are retracted toward the lower table until their tips are flush with, or lower than, the table surface and a negative pressure is supplied to the suction holes in the lower table to hold the substrate. The lower table has an electrostatic suction means to hold the substrate in place even when the chamber is evacuated. It is also acceptable that the lower table has an adhesive pin drive mechanism like the upper table. If that is the case, the distance of movement for the adhesive pins of the lower table may be shorter than that for the upper table.

Once the upper and lower substrates have been positioned and held on the adhesive pins 14c and the lower table 10 respectively, the Z-axis drive means 2 is activated to lower the top frame 5, upper chamber 7 and upper table 9 and unite the upper chamber 7 and the lower chamber 8 through the seal ring to make up a vacuum chamber. Synchronously with this action, the adhesive pin drive mechanism 14 is also lowered by the vertical drive motor 14a and the adhesive pin up/down means 14d so as to keep its positional relationship with the upper table 9 unchanged. The spacing between the opposite faces of the upper substrate (held on the upper table 9) and lower substrate (held on the lower table 10) should be kept several millimeters, namely the upper and lower substrates should not touch each other. Then, air is evacuated from the vacuum chamber through exhaust holes in the lower chamber 8 to depressurize the inside of the vacuum chamber (not shown). When the degree of vacuum in the vacuum chamber is sufficient for laminating work, an error of alignment between preset positioning marks on the upper and lower substrates is calculated using a camera with a long focal depth installed on the lower unit side. If the camera's focal depth is short, a means for moving the camera up and down is installed and the upper substrate's positioning mark is first recognized, then the camera is lowered to recognize the lower substrate's positioning mark to calculate an error of alignment between the positioning marks of the upper and lower substrates. After that, the X-Y-θ moving unit 13 is activated to move the lower table 10 to correct the error of alignment between the upper and lower substrates in the X, Y and θ directions. Alternatively this positioning step for alignment may be carried out during depressurization for laminating work.

After alignment of the upper and lower substrates has been finished, the Z-axis drive means 2 is activated to move the upper table 9 through the intermediary of the top frame 5 and synchronously with this action the adhesive pin drive mechanism 14 is moved toward the lower table 10 to let the upper and lower substrates touch each other. With the upper and lower substrates in contact with each other, the positioning marks of the upper and lower substrates are again checked for an alignment error and if there is an alignment error, positioning for alignment is made again. After check and positioning are ended, only the upper table 9 descends to pressurize and release the upper substrate from the adhesive pins 14c. When the substrate is pressurized, the elastic body 11a on the elastic plate 11 attached to the upper table 9 is deformed so that the whole substrate is evenly pressurized. Sine it may happen that the substrates held on the tables get out of place, the positioning marks should be occasionally checked and an alignment error, if any, should be corrected.

After the upper and lower substrates has been laminated by pressurization, air is introduced into the vacuum chamber to return it to the atmospheric pressure. As the atmospheric pressure is restored, a further pushing force is applied to the substrates until a prescribed laminate thickness is reached. Then, a UV radiating means (not shown) is activated to harden several adhesive agent points to fix the substrates temporarily. This concludes the laminating process for a liquid crystal panel.

In the above operation sequence, the adhesive pins hold a substrate only until either of the upper and lower substrates touches the adhesive agent (sealant) on the other substrate; then the adhesive pins do not descend further but only the upper table descends to remove the pins from the substrate surface. By moving the adhesive pins in a direction opposite to the direction of movement of the substrate, they can be removed from the substrate surface more reliably.

Another possible approach is as follows. When the substrate is pressurized, the adhesive pins 14c are also moved toward the lower table simultaneously and after pressurization is finished and the atmospheric pressure is restored, the table is held in the same condition as during pressurization and the adhesive pin drive mechanism 14 is moved up to remove the adhesive pins from the substrate. In this case, if a positive pressure gas or fresh air is supplied into the suction/adsorption holes at the tips of the adhesive pins while the pins are being moved up, the pins can be removed from the substrate surface easily.

As described above, in the method according to this embodiment, when the adhesive pins are removed from the substrate surface, the surrounding elastic body functions as a cushion which prevents a large pulling force from acting on the substrate surface parts at the adhesive pin positions and disperses the pulling force, so that the substrate is hardly deformed.

After the process of laminating a pair of substrates has been finished, a preparatory step for a next substrate laminating process and removal of the finished liquid crystal panel are carried out as described earlier.

As explained so far, according to the present invention, the possibility that panel deformation occurs during release of laminated substrates is smaller than in the conventional method. In addition, the use of an elastic body ensures that substrates are evenly pressurized, making it possible to provide a laminating apparatus which produces higher quality panels.

What is claimed is:

1. A substrate assembling apparatus in which one substrate with drops of liquid crystal is held on a lower table and another substrate is held on an upper table, facing the one substrate, and the substrates are laminated in a vacuum chamber using an adhesive agent provided on either of the substrates, wherein the upper table inside the chamber includes, on its substrate holding face, an elastic plate including an elastic body, a vacuum suction means and a purge gas blow means;

a plurality of adhesive pins are provided on an adhesive pin plate, located adjacent to the upper table, which can move up and down independently from the upper table;

the upper table and the elastic plate include through holes through which the adhesive pins can move to contact said another substrate; and the adhesive pins include adhesion means at their tips to hold said another substrate, wherein each adhesive pin includes an adhesive member on its tip and a suction/adsorption hole in the center of the tip to permit either negative or positive pressure to be applied to said another substrate through said suction/adsorption hole.

2. The substrate assembling apparatus according to claim 1, wherein said another substrate is brought into close contact with the elastic body by a vacuum suction means and held by the adhesion means at the tips of the adhesive pins to perform assembling work in vacuum.

3. The substrate assembling apparatus according to claim 1, wherein, by moving up said another substrate held on the adhesive members of the tips of the adhesive pins by a means for moving the adhesive pins up and down, the substrate is pushed against the elastic plate so that the elastic plate exerts pressure on the substrate, to push the substrate away from the adhesive pins so that the adhesive members of the adhesive pins are removed from the substrate surface.

4. The substrate assembling apparatus according to claim 1,
   wherein, by moving up said another substrate held on the adhesive members of the tips of the adhesive pins by a means for moving the adhesive pins up and down, the substrate is pushed against the elastic plate so that the elastic plate exerts pressure on the substrate, to push the substrate away from the adhesive pins so that the adhesive members of the adhesive pins are removed from the substrate surface, and
   wherein the adhesive pins are removed from the substrate surface by moving up the adhesive pins while supplying a positive pressure gas through said suction/adsorption holes from the tips of the adhesive pins to the substrate surface.

5. A substrate assembling apparatus in which one substrate with drops of liquid crystal is held on a lower table and another substrate is held on an upper table, facing the one substrate, and the substrates are laminated in a vacuum chamber using an adhesive agent provided on either of the substrates,
   wherein the upper table inside the chamber includes, on its substrate holding face, an elastic plate including an elastic body, a vacuum suction means and a purge gas blow means;
   a plurality of adhesive pins are provided on an adhesive pin plate, located adjacent to the upper table, which can move up and down independently from the upper table;
   the upper table and the elastic plate include through holes through which the adhesive pins can move to contact said another substrate; and
   the adhesive pins include adhesion means at their tips to hold said another substrate,
   wherein each adhesive pin includes an adhesive member on its tip and a suction/adsorption hole in the center of the tip to permit either negative or positive pressure to be applied to said another substrate through said suction/adsorption hole,
   the substrate assembling apparatus further comprising means for removing said another substrate from the adhesive members of each adhesive pin without distortion of said another substrate, said means comprising means for moving up said another substrate held on the adhesive members of the tips of the adhesive pins by a means for moving the adhesive pins up and down to push the substrate against the elastic plate so that the elastic plate exerts pressure on the substrate to push the substrate away from the adhesive pins so that the adhesive members of the adhesive pins are removed from the substrate surface.

* * * * *